(12) United States Patent
Tresp et al.

(10) Patent No.: US 6,247,001 B1
(45) Date of Patent: Jun. 12, 2001

(54) METHOD OF TRAINING A NEURAL NETWORK

(75) Inventors: Volker Tresp; Ralph Neuneier, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/142,275

(22) PCT Filed: Feb. 26, 1997

(86) PCT No.: PCT/DE97/00340

§ 371 Date: Sep. 3, 1998

§ 102(e) Date: Sep. 3, 1998

(87) PCT Pub. No.: WO97/33235

PCT Pub. Date: Sep. 12, 1997

(30) Foreign Application Priority Data

Mar. 6, 1996 (DE) ............................................. 196 08 736

(51) Int. Cl.[7] ........................................................ G06F 9/445

(52) U.S. Cl. ................................................. 706/15; 706/15

(58) Field of Search ...................................... 706/16, 21, 25, 706/15, 13; 705/35–37

(56) References Cited

U.S. PATENT DOCUMENTS

| | | | | |
|---|---|---|---|---|
| 5,461,699 | * | 10/1995 | Arbabi et al. | 706/21 |
| 5,644,727 | * | 7/1997 | Atkins | 705/40 |
| 5,751,915 | * | 5/1998 | Werbos | 706/4 |
| 5,761,442 | * | 6/1998 | Barr et al. | 705/36 |
| 5,802,506 | * | 9/1998 | Hutchison | 706/20 |

OTHER PUBLICATIONS

R. Neuneier, "Optimal Asset Allocation Using Adaptive Dynamic Programming," Proceedings of the 1995 Conference on Advances in Neural Information Processing Systems 8, pp. 952–958, Nov. 1995.*

K.P. Vishwakarma, "A Neural Network to Predict Multiple Economic Time Series," 1994 IEEE International Conference on Neural Networks, IEEE World Congress on Computational Intelligence, vol. 6, pp. 3674–3679, Jul. 1994.*

P. Werbos, "Finding Time Series Among the Chaos: Stochastics, deseasonalization, and Texture–Detection Using Neural Nets, " Proceedings of the IEEE/IAFE 1996 Conference on Computational Intelligence for Financial Engineering, p. 58, Mar. 1996.*

Proceedings of 1995 Conference on Advances in Neural Information Processing Systems 8, XP 000675769, Ralph Neuneier, "Optimal Asset Allocation Using Adaptive Dynamic Programming", pp. 952–958.

ICANN 1994, Proceedings of International Conference on Artificial Neural Networks, XP 000675756, Ralph Neuneier et al, "Estimation of Conditional Densities: A Comparison of Neural Network Approaches", pp. 689–692.

(List continued on next page.)

Primary Examiner—Mark R. Powell
Assistant Examiner—Michael B. Holmes
(74) Attorney, Agent, or Firm—Schiff Hardin & Waite

(57) ABSTRACT

A state vector ($SV_t$) is determined with elements that characterize a financial market (101). Taking into account predetermined evaluation variables, an evaluation ($V_t$) is determined (102) for the state vector ($SV_t$). In addition, a chronologically following state vector ($SV_{t+1}$) is determined (103) and evaluated ($V_{t+1}$). On the basis of the two evaluations ($V_t$, $V_{t+1}$), weights ($w_t$) of the neural network (NN) are adapted (104) using a reinforcement learning method ($\Delta w_t$).

10 Claims, 3 Drawing Sheets

OTHER PUBLICATIONS

Proceedings of the Third International Conference on Neural Networks in the Capital Markets, Proceedings of the 3$^{rd}$ International Conference on Neural Networks in Financial Engineering, 1996, XP 000675784, Dirk Ormoneit et al, "Reliable Neural Network Predictions in the Presence of Outliers and Non–Constant Variances", pp. 578–587.

Proceedings of the International Conference on Neural Networks, 1990, Institute of Electrical and Electronics Engineers, XP 000145423, Catherine Myers, "Reinforcement Learning When Results are Delayed and Interleaved in Time", pp. 860–863.

Proceedings of the Conference on Decision and Control, 1992, Institute of Electrical and Electronics Engineers, XP 000370157, Judy A. Franklin, "Qualitative Reinforcement Learning Control", pp. 870–877.

Edwin J. Elton et al, Modern Portfolio Theory and Investment Analysis, John Wiley & Sons, Inc., New York, (1981), ISBN 0–471–53248–7, pp. 15–93.

Andrew G. Barto et al, Learning to Act Using Real–Time Dynamic Programming, Department of Computer Science, University of Mass., Amherst MA 01003, Jan. 12, 1993, pp. 1–65.

* cited by examiner-

METHOD OF TRAINING A NEURAL NETWORK

BACKGROUND OF THE INVENTION

The invention relates to a method for training a neural network with training data that characterize a financial market. Attempts are constantly being made to predict changes in a financial market, in order in this way to achieve an optimal asset allocation, also known as portfolio management. By an asset allocation is meant the investment of liquid capital in various trade options, such as for example, stocks, futures, bonds, or also foreign currencies, thus in all possibilities offered by a financial market as a whole. A portfolio is formed with the goal of achieving a maximum return for a predeterminable risk that the investor is willing to take within a predeterminable time interval.

From E. Elton et al., Modern Portfolio theory and Investment Analysis, John Wiley & Sons, Inc., $4^{th}$ edition, New York, ISBN 0-471-53248-7, pages 15–93, 1981, basic principals of asset allocation and investment analysis are known. From this article, a model is likewise known, called the two-point model, for the specification of an achievable return dependent on a risk taken by the investor in the investment opportunity. However, the attempt to make predictions concerning changes in the financial market on the basis of this model is very imprecise, since neither the chronological aspect of the changes of the financial market nor the transaction costs that arise in trades on the financial market are taken into account.

A further disadvantage that can be seen in the model described in this article is that actual data concerning changes of the financial market can in no way be taken into account. This leads to an inflexible, imprecise statement concerning changes of the financial market, based on the model.

In addition, what is known as a reinforcement learning method is known for example from A. Barto et al., Learning to Act Using Real-Time Dynamic Programming, Department of Computer Science, University of Massachusetts, Amherst, Mass. 01003, pages 1–65, January 1993.

SUMMARY OF THE INVENTION

The underlying problem of the invention is to train a neural network while taking into account parameters that characterize the financial market.

In general terms the present invention is a method for training a neural network, in which the following steps are iteratively executed:

a state vector is determined that has elements that characterize a financial market;

for the state vector, an evaluation relating to predetermined evaluation variables is determined; and using a reinforcement learning method, weights of the neural network are adapted, at least on the basis of the evaluation of this state vector and on the basis of a determined evaluation of at least one following state vector.

In the inventive method, the asset allocation is modeled as a Markov decision problem. Each state of the Markov decision problem is described by a state vector containing elements that characterize the financial market. Since given a large number of influencing variables, the Markov decision problem is very high-dimensional, the reinforcement learning method is used for the training of the neural network. In the use of this method, both the state vector of a first time step and also the state vector of a following time step are taken into account.

This procedure for training a neural network has a number of advantages, in particular with respect to a further application of the neural network trained in this way in order to make statements concerning the changes in the financial market.

A considerable advantage of the inventive method is that chronological changes of the financial market are taken into account in the model.

Furthermore, data that have actually arisen in the past are taken into account in the training. The training data used for the training of the neural network, i.e. the respective state vector, can be used for the training without an actual outlay of capital by the investor for trades on the financial market. Through the use of a large amount of past data of the financial market, the model adapted on the basis of the data becomes very flexible with respect to changes of the financial market.

A further advantage of the inventive method is that the evaluation variables used for the evaluation of the state vectors are very flexible, and are thus easily exchanged or, respectively, expanded, dependent on the respective specific aspect of application. For example, here the classical evaluation variables of return and risk, or also further evaluation variables, such as an inflation rate or, for example, also safe custody fees, can be taken into account.

Advantageous developments of the present invention are as follows:

The state vector respectively has at least one of the following variables: at least one rate of at least one stock index; at least one indication of at least one bond market interest rate; at least one exchange rate indication for at least one first currency into at least one second currency; a gold price; and variables that describe a price-earnings ratio of at least one business enterprise.

The state vector respectively has at least one indication concerning a state of capital of an investor.

The predetermined evaluation quantities describe at least an investment risk and/or at least one determined return of at least one type of investment.

The predetermined evaluation variables describe at least transaction costs of at least one investment type. This takes into account transaction costs that arise due to trades on the financial market.

Given several possible following state vectors, a probability of occurrence is determined for all following state vectors. The evaluation is determined by means of summation of the evaluations of all possible following state vectors, multiplied by the respective probability of occurrence of the state vector. As a result a subsequent time step, are determined, whereby it is possible to train the neural network on the basis of several different successive states.

A reduction factor is provided, by means of which, as the number of iterative steps executed increases, the evaluations as a result of the at least one following state vector are reduced. As a result, an aspect is taken into account by means of which, as the number of iteration steps executed increases, evaluation results, for example the return for returns lying far in the future, are evaluated lower than the returns to be achieved in the near future.

The present invention is also a method for determining an investment decision using a neural network trained with a method described above, in which the following state vector that results given the respective investment decision is determined for at least two of all possible investment decisions, and in which that investment decision is recommended to a user that leads to a higher evaluation of the following state vector with respect to the evaluation variables.

The present invention is also a method for determining an investment decision using a neural network trained with a method described above in which the following state vector that results given the respective investment decision is determined for at least two of all possible investment decisions, and in which that investment decision is taken that leads to a higher evaluation of the following state vector with respect to the evaluation variables. Investment decisions are made using the neural network trained in the way described above, and these investment decisions are evaluated. In this way, a criterion is determined for estimating the quality of an investment decision in a financial market. For the investor, this can be an important aid in decisions relating to investments on the financial market, and thus in the formation of his specific asset allocation.

The present invention is further a method for determining an investment strategy using a neural network trained with a method described above in which several sequences of investment decisions, with various values of the evaluation variables, are determined, and in which a sequence of investment decisions that is optimal with respect to a predeterminable goal is determined from the sequences of investment decisions, and in which the investment strategy results from the evaluation variables that were used in the optimal sequence of investment decisions. Thus, it is possible to determine an optimal investment strategy for the asset allocation. This can take place within predeterminable limitations, e.g. a maximum risk that the investor is willing to take with his portfolio.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
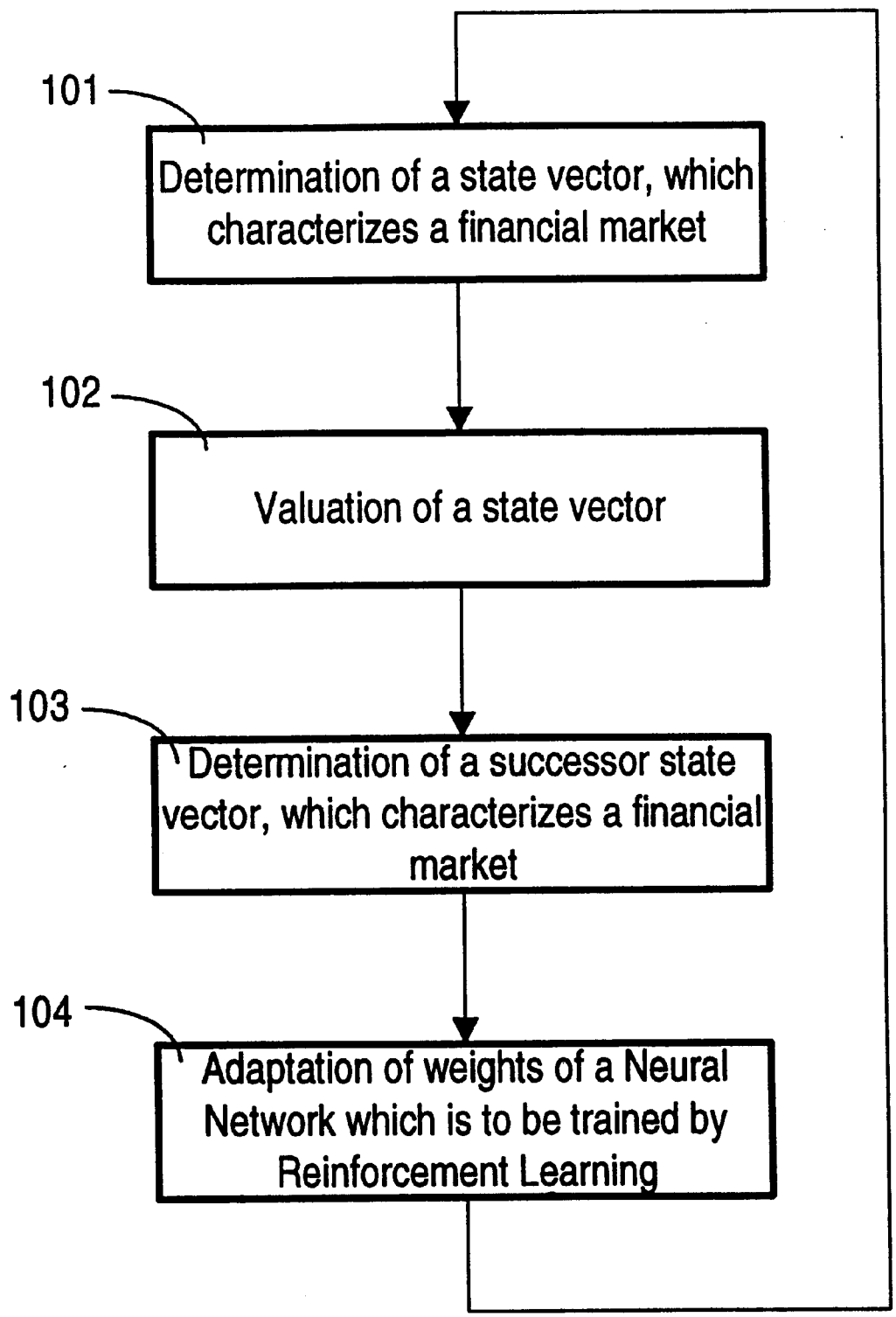
FIG. 1 shows a flow diagram that describes individual method steps of the method according to patent claim 1.

In FIG. 1, the individual method steps of the inventive method are shown. In a first step 101, a state vector $SV_t$ is determined that comprises elements that characterize a financial market.

The state vector $SV_t$ can for example comprise the following items of information:
  a first market value, for example the final market value of the German stock index (DAX),
  a second market value, for example the final market value of the CDAX,
  a market value of what is known as the Morgan Stanley Index Deutschland,
  a three-month interest rate for the German or European financial market,
  a national running return,
  a third market value, for example the final market value of a market day of what is called the Dow Jones Industrial Index USA,
  a fourth market value, for example the market value of what is called the Nikkei Index (Japan),
  what is known as the Morgan Stanley Index Europe,
  at least one exchange rate of a first currency, e.g. of a national currency, for example in the currency U.S. dollars,
  a market value of the USA treasury bonds with various maturities,
  the market value of gold,
  variables that describe a price-earnings ratio of at least one business enterprise.

Further elements that characterize a financial market can easily be taken into account in the inventive method, according to the case of application. The selection shown above by way of example is in no way to be understood as final.

In addition, in a construction of the method it can be provided that the state vector $SV_t$ indicates the respective current state of capital of an investor.

For the state vector $SV_t$, an evaluation $V_t$ is determined 102 on the basis of predetermined evaluation variables.

As evaluation variables, the following can for example be provided:
  for each possible type of investment (stock, future, bond, etc.) a return r to be expected, as well as an expected risk taken in the selection of the type of investment,
  the rate of inflation,
  safe holding fees, or
  transaction costs incurred in each transaction made by the investor on the financial market.

This enumeration is also in no way to be understood as final.

Basic principles concerning returns r to be determined and risks of various types of investment are described in the document a first article by E. Elton et. al., "Modern Portfolio Theory and Investment Analysis", John Wiley & Sons, Inc., $4^{th}$ edition, New York, ISBN 0 471-53248-7, pages 15–93, 1981.

In addition, a chronologically following state vector $SV_{t+1}$ is determined 103. The chronologically following state vector $SV_{t+1}$ of course depends respectively on the investment decision made, based on the state vector $SV_t$.

A time index t hereby respectively designates an iteration step. The time index t is an arbitrary natural number. For the chronologically following state vector $SV_{t+1}$ as well, an evaluation $V_{t+1}$ is determined in the same way as this was determined for the state vector $SV_t$. The method is thus carried out iteratively for all time steps t for which training data exist and are taken into account.

On the basis of the evaluation $V_t$ of the state vector $SV_t$ and the evaluation $V_{t+1}$ of the following state vector $SV_{t+1}$ with the aid of a reinforcement learning method weights $w_i$ of a neural network NN to be trained are adapted. The reinforcement learning method is known from the document a second article by A. Barto et al., "Learning to Act Using Real-time Dynamic Programming," Department of Computer Science, University of Massachusetts, Amherst, Mass. 01003, pages 1–65, January 1993.

In the inventive method, the method steps described above are executed iteratively for each known set of training data. A training data set is a respective value, known from known past market curves, of the respective state vector $SV_t$ for the respective iteration step t and, possibly, a virtual portfolio.

The inventive method makes it possible to train the neural network NN with a stochastic behavior of the financial market without having to invest capital directly in the financial market. A further considerable advantage of the inventive method and its developments lies in the flexibility of parameters taken into account, as well as in the taking into account of the transaction costs for a trade on the financial market.

In a construction of the inventive method, it is provided that as the number of iteration steps increases, the respective following state vector $SV_{t+1}$, with its evaluation $V_{t+1}$ with the preceding iteration steps, enters in an ever-decreasing measure into the adaption of the weights. For this purpose, a reduction factor $\lambda$ is provided. The reduction factor $\lambda$ can for example be formed by a number whose value is smaller than 1, but however is close to 1, for example 0.99. The reduction factor $\lambda$ is raised to the power of the iterative step t. There thus results e.g. $0.99^t$. For a very simple example, taking into account only the return r and the evaluation $V_{t+1}$ of the following state vector $SV_{t+1}$ and of the reduction factor $\lambda$, the evaluation $V_t$ can result as:

$$V_t = r + \lambda \cdot V_{t+1} \quad (1).$$

Since the respective return r and the respective evaluation of the following state vector $SV_{t+1}$ can be determined from the known market curves of the training data, the evaluation $V_{t+1}$ for the following state vector $SV_{t+1}$ is unproblematically possible. Given a multiplicity of decision possibilities for the investment decision, e.g., in a simplest case, whether a particular form of investment is selected, and thus shares of this form of investment are purchased or not, at least two of the various investment decisions are respectively carried out, and the evaluation $V_t$ of the state vector $SV_t$ is respectively determined for the investment decision made, based on the evaluation $V_{t+1}$ of the following state vector $SV_{t+1}$, said evaluation $SV_{t+1}$ resulting from the respective investment decision.

The adaption $\Delta w_i$ of the weights $w_i$ of the neural network NN to be trained takes place by means of what is called the reinforcement learning method, e.g. according to the following rule:

$$\Delta w_i = (V_t - (r + \lambda \cdot V_{t+1})) \cdot \frac{\delta NN}{\delta w_i}, \quad (2)$$

whereby
each weight $w_i$ of the neural network NN to be trained is designated with an index i, and
a partial derivative of the output function of the neural network NN, according to the weight $w_i$, respectively to be adapted, of the neural network NN, is respectively designated with $$\frac{\delta NN}{\delta w_i}.$$

Figure 2:
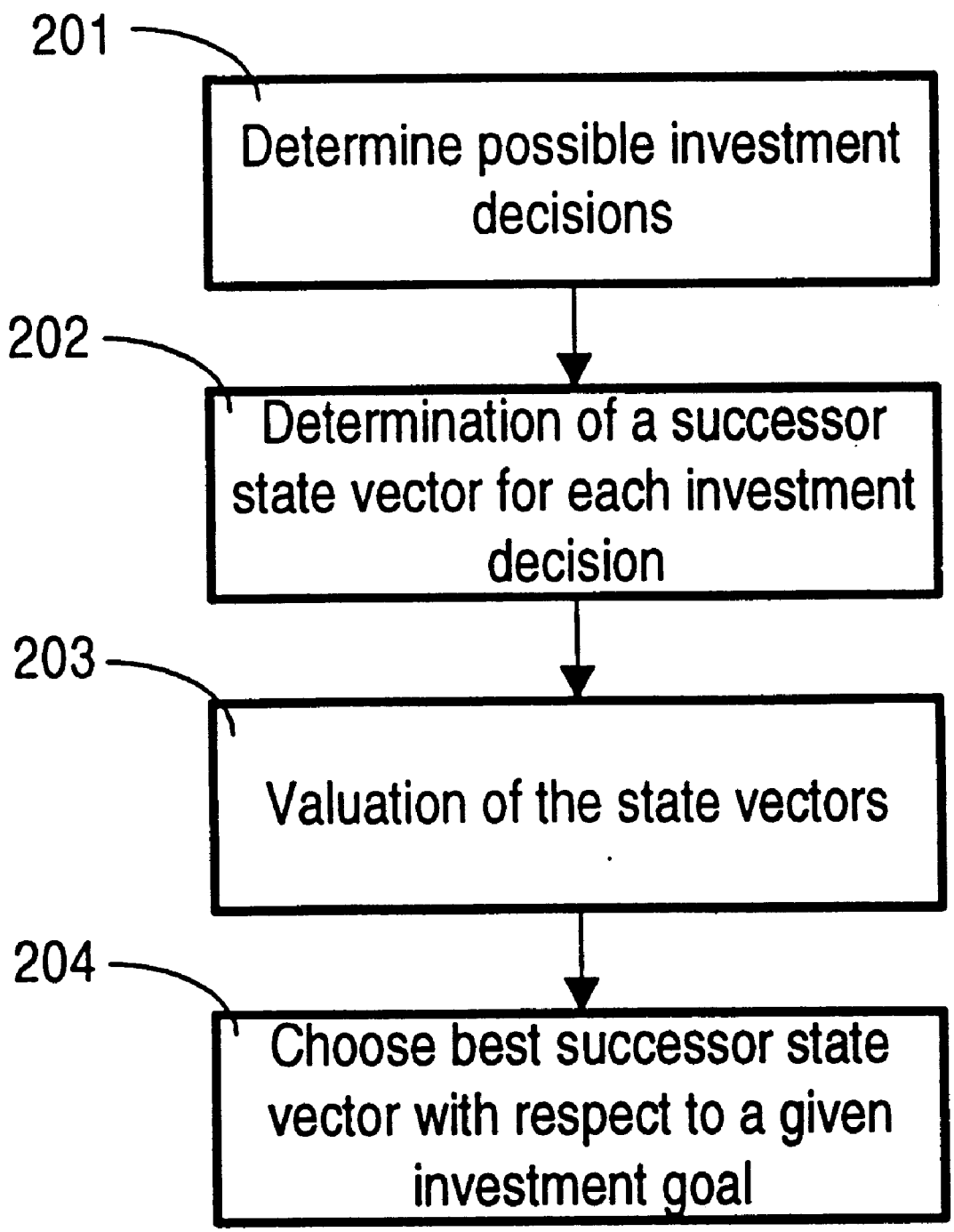
FIG. 2 shows a flow diagram with method steps of the method according to patent claim 8.

The neural network NN trained in the way described above can now, in a development of the method, be used to determine an investment decision (cf. FIG. 2). Given a large number of possible investment decisions, this takes place by determining 203, for each investment decision determined in a first step 201, the evaluation $V_{t1}$ of the state vector $SV_t$ dependent on the respective investment decision. In the determination of the evaluation $V_t$, the following state vector $SV_{t+1}$ for the investment decision respectively made is again determined 202.

From the evaluations $SV_t$, whose number corresponds to the number of investment decisions, that investment decision is selected that has led to the respective evaluation $V_t$ yielding the most optimal value for a predeterminable investment goal 204. The determined investment decision can either be recommended to a user, for example by presenting the result on a display screen BS or via a printer DR, or the investment decision can also be made directly, independent of the user, e.g. the investor.

However, the trained neural network NN can also be used to determine an overall investment strategy. For this purpose, an entire series of state vectors $SV_t$ is determined, with various values of the evaluation variables, and thus of the investment goals and of the investment strategy. Variations in the risk that the investor is prepared to take in the formation of the portfolio, or also the level of the return r that is to be achieved, are hereby for example to be taken into account.

For the various sequences of investment decisions, the chronologically final value of the evaluation $V_t$ of the chronologically final state vector $SV_t$ is respectively determined, and the values are compared with one another. From these results, the most optimal investment strategy, i.e. the investment strategy having for example the maximum return with minimum risk, is determined.

The determination of the most optimal investment strategy can also take place under predeterminable restrictions, for example taking into account a maximum risk that the investor is prepared to take. Further restrictions, possibly taking the form that particular investment types are excluded from the outset, are provided in developments of the inventive method.

Figure 3:
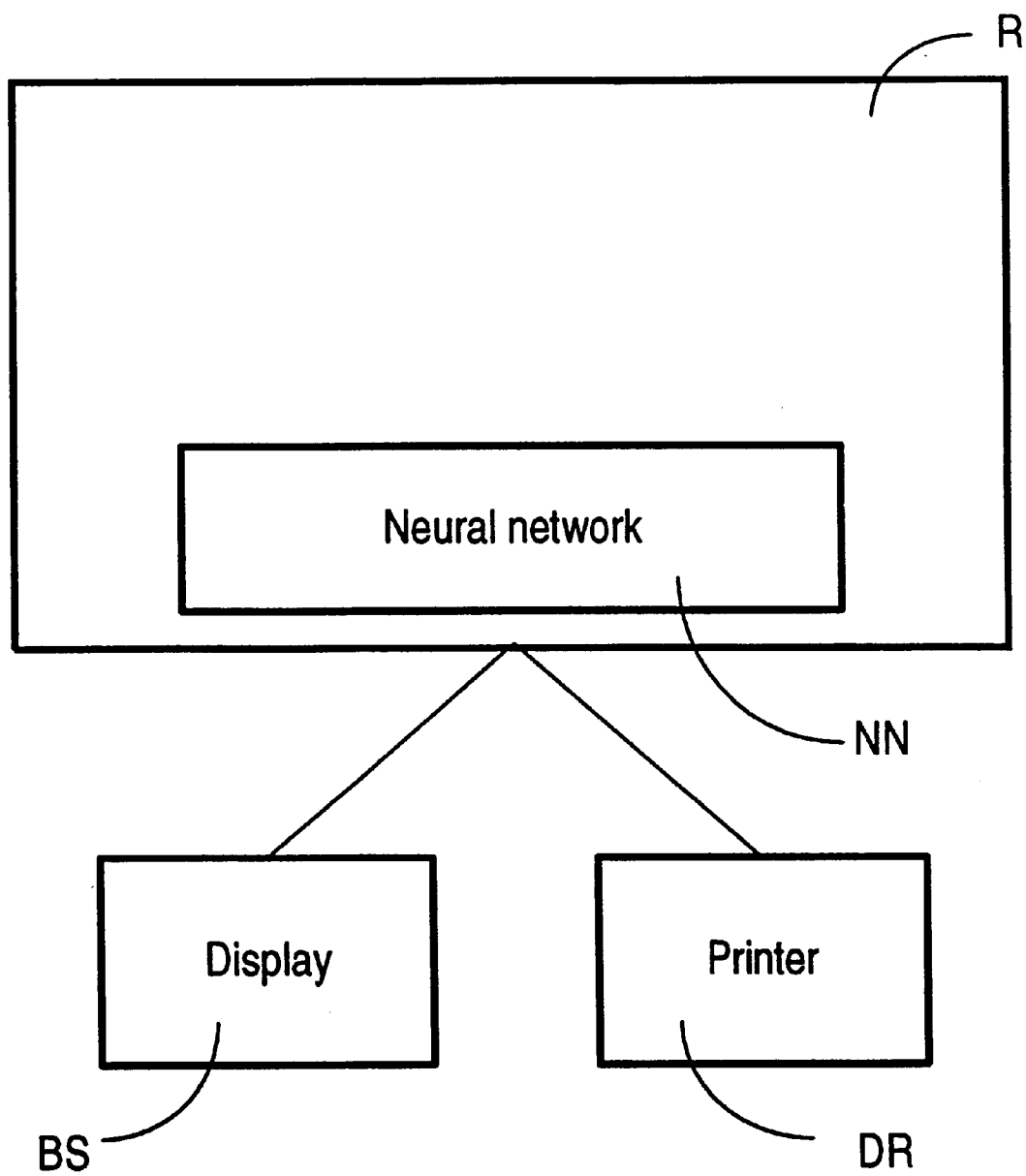
FIG. 3 shows a drawing of a computer arrangement with which the method is necessarily executed, having a display screen and a printer for the presentation of the method results.

FIG. 3 shows an arrangement of a computer R with which the inventive method is necessarily carried out. Furthermore, FIG. 3 shows the display screen BS and the printer DR, with which the respective result of the inventive method determined by the computer can be displayed to a user. In addition, in the arrangement the neural network NN trained by the computer R is shown symbolically.

What is claimed is:

1. A method for training a neural network, comprising the following steps that are iteratively executed:
    determining a state vector that has elements that characterize a financial market;
    determining for the state vector, an evaluation relating to predetermined evaluation variables; and
    adapting, using a reinforcement learning method, weights of the neural network, at least based on the evaluation of this state vector and based on a determined evaluation of at least one following state vector.

2. The method according to claim 1, wherein the state vector respectively has at least one of the following variables:
    at least one rate of at least one stock index,
    at least one indication of at least one bond market interest rate,
    at least one exchange rate indication for at least one first currency into at least one second currency,
    a gold price,
    variables that describe a price-earnings ratio of at least one business enterprise.

3. The method according to claim 1, wherein the state vector respectively has at least one indication concerning a state of capital of an investor.

4. The method according to claim 1, wherein the predetermined evaluation variables describe at least one of an investment risk and at least one determined return of at least one type of investment.

5. The method according to claim 1, wherein the predetermined evaluation variables describe at least transaction costs of at least one investment type.

6. The method according to claim 1, wherein, given several possible following state vectors a probability of occurrence is determined for all following state vectors, and wherein the evaluation is determined by summing the evaluations of all possible following state vectors, multiplied by a respective probability of occurrence of the state vector.

7. The method according to claim 1, wherein a reduction factor is provided, by which, as the number of iterative steps executed increases, the evaluations of the at least one following state vector are reduced.

8. A method for determining an investment decision, comprising the steps of:

training a neural network by iteratively executing the following steps;
  a) determining a state vector that has elements that characterize a financial market,
  b) determining for the state vector, an evaluation relating to predetermined evaluation variables,
  c) adapting, using a reinforcement learning method, weights of the neural network, at least based on the evaluation of this state vector and based on a determined evaluation of at least one following state vector, the following state vector that results given the respective investment decision being determined for at least two of all possible investment decisions; and recommending that investment decision to a user that leads to a higher evaluation of the following state vector with respect to the evaluation variables.

9. A method for determining an investment decision, comprising the steps of:

training a neural network by iteratively executing the following steps;
  a) determining a state vector that has elements that characterize a financial market,
  b) determining for the state vector, an evaluation relating to predetermined evaluation variables,
  c) adapting, using a reinforcement learning method, weights of the neural network, at least based on the evaluation of this state vector and based on a determined evaluation of at least one following state vector, the following state vector that results given the respective investment decision being determined for at least two of all possible investment decisions; and selecting that investment decision that leads to a higher evaluation of the following state vector with respect to the evaluation variables.

10. A method for determining an investment strategy, comprising the steps of:

training a neural network by iteratively executing the following steps;
  a) determining a state vector that has elements that characterize a financial market,
  b) determining for the state vector, an evaluation relating to predetermined evaluation variables,
  c) adapting, using a reinforcement learning method, weights of the neural network, at least based on the evaluation of this state vector and based on a determined evaluation of at least one following state vector, several sequences of investment decisions, with various values of the evaluation variables, being determined;

determining a sequence of investment decisions that is optimal with respect to a predeterminable goal from the sequences of investment decisions; and determining an investment strategy from the evaluation variables that were used in the optimal sequence of investment decisions.

* * * * *